Figure 1:
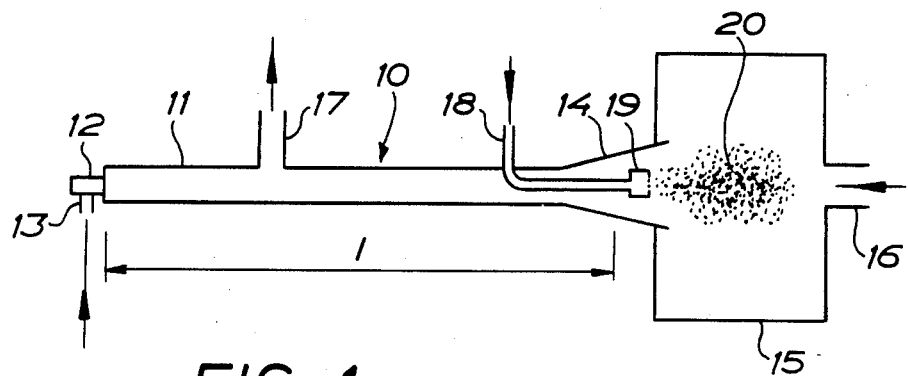

United States Patent [19]

Olsson et al.

[11] Patent Number: 4,721,395

[45] Date of Patent: Jan. 26, 1988

[54] METHOD AND APPARATUS FOR INCREASING THE TURBULENCE IN A GAS EXPOSED TO LOW FREQUENCY SOUND

[76] Inventors: Mats A. Olsson, Björkrisvägen 15, S-161 39 Bromma; Hans-Bertil Hakansson, Igelkottsvägen 3, S-612 00 Finspång, both of Sweden

[21] Appl. No.: 916,543

[22] PCT Filed: Jan. 22, 1986

[86] PCT No.: PCT/SE86/00019

§ 371 Date: Oct. 3, 1986

§ 102(e) Date: Oct. 3, 1986

[87] PCT Pub. No.: WO86/04263

PCT Pub. Date: Jul. 31, 1986

[30] Foreign Application Priority Data

Jan. 22, 1985 [SE] Sweden .................. 8500276

[51] Int. Cl.$^4$ ............ B01F 11/00; B01F 11/02; B01J 19/10; B06B 1/20
[52] U.S. Cl. ........................... 366/348; 55/292; 116/137 R; 366/108; 366/349
[58] Field of Search ......... 366/348, 349, 124, 108, 366/116, 142, 600; 116/137 R, 137 A, 140; 55/277, 276, 292

[56] References Cited

U.S. PATENT DOCUMENTS

| 3,109,721 | 11/1963 | Zenner | 55/277 |
| 3,259,272 | 7/1966 | Larson | 366/108 |
| 3,467,363 | 9/1969 | Reichel | 366/124 |
| 4,359,962 | 11/1982 | Olsson | 116/137 R |
| 4,533,255 | 8/1985 | Gronholz | 366/108 |

FOREIGN PATENT DOCUMENTS 908487 4/1954 Fed. Rep. of Germany.
1917962 2/1971 Fed. Rep. of Germany.

Primary Examiner—Robert W. Jenkins
Attorney, Agent, or Firm—Merchant, Gould, Smith, Edell, Welter & Schmidt

[57] ABSTRACT

Method and apparatus for increasing the turbulence in a gas exposed to low frequency sound. The gas is exposed to sound produced by a sound generator (10) which has a tubular resonator (11) having an open end and is operated at one of the resonance frequencies of the resonator having a maximum frequency of 150 Hz. The gas is flown into the tubular resonator through the open end thereof and is discharged from the resonator substantially in a region, where the sound pressure of the standing wave in the resonator has a node, after having passed through a substantial length of the resonator.

15 Claims, 8 Drawing Figures

METHOD AND APPARATUS FOR INCREASING THE TURBULENCE IN A GAS EXPOSED TO LOW FREQUENCY SOUND

The present invention relates to method and apparatus for the purpose of increasing the turbulence in gas exposed to low frequency sound produced by a sound generator including a tubular resonator having an open end.

The International Application WO No. 80/01358 describes method and apparatus for actuating particles wherein the particles are exposed to a rapid reciprocating air flow generated by intense sound, preferably of a low frequency. The reciprocating air flow is utilized for the actuation of particulate material adsorbed or absorbed by an air permerable layer or support located at a position where the particle velocity of the sound is at maximum. By the forced or accelerated airing provided by the reciprocating air flow through the layer with the particulate material entrained therein, said material can be mixed or evaporated. The reciprocating air flow is generated by a low frequency sound generator with a resonator operating at a frequency of the order of 15–50 Hz.

According to a method, described in SE Application No. 8306653-0, for the combustion of fluidal fuels, the fuel is dispersed in combustion air and, in order to improve the combustion rate and efficiency, is exposed to a high particle velocity of a sound produced by a low frequency sound generator having a maximum frequency of 50 Hz. The sound generator is a quarter wave type sound generator with a tubular resonator forming a diffuser at the open end thereof. The combustion air is emitted from the open end of the resonator with the fuel entrained therein, the fuel being combusted substantially outside the resonator.

According to another method, described in SE Application No. 8405914-6, for the combustion of large solid fuels a fuel bed, located on a grate located in a three quarter wave resonator, is exposed to pulsating combustion air having a maximum frequency of 50 Hz. The flue gases from the bed are discharged through the resonator.

The object of the invention is to provide a method by which there is obtained a high turbulence in a gas passing through a tube or a space of tubular shape. This turbulence is used to obtain a homogenous mixing of said gas and an injected fluid such as powder, liquid or gas.

More particularly the invention provides a method for intense mixing of flue gases and a pulverulent liquid or gaseous chemical substance in order to intensify chemical reaction between said substance and contaminating constituents of the flue gases, such as $SO_x$ and $NO_x$.

The intense mixing obtained by the method of the invention also can be used for evaporating the liquid phase of a liquid containing solid material e.g. in spray drying a liquid in the manufacture of instant products or in the wet-dry $SO_2$-limestone reaction process.

In order to achieve these and other objects which will be apparent from the description which follows, the invention provides a method of the kind referred to above, which has obtained, according to the invention, the characteristics appearing from claim 1.

The invention also provides an apparatus for working the method of the invention, as claimed in claim 7.

Figure 2:
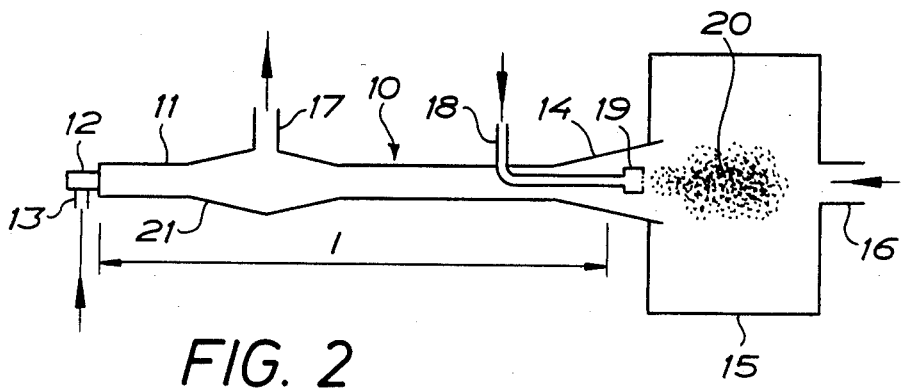
Figure 3:
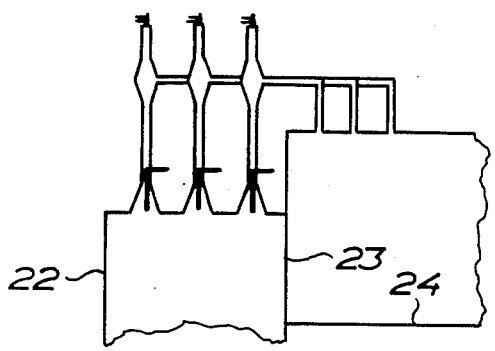
Figure 4:
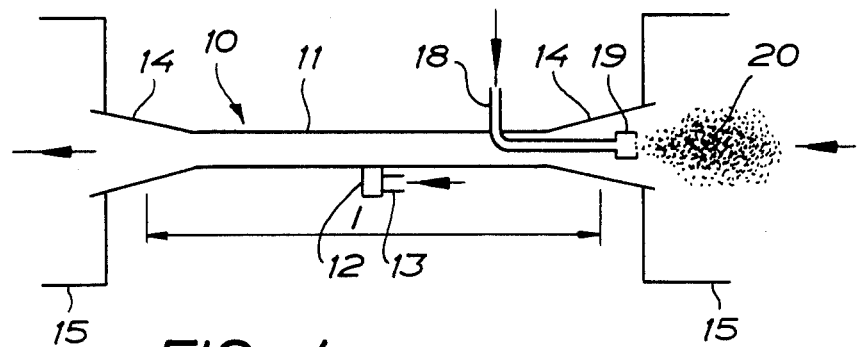
Figure 5:
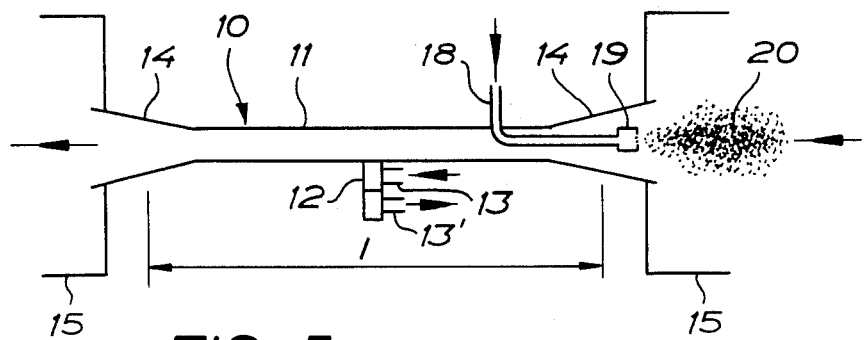
Figure 6:
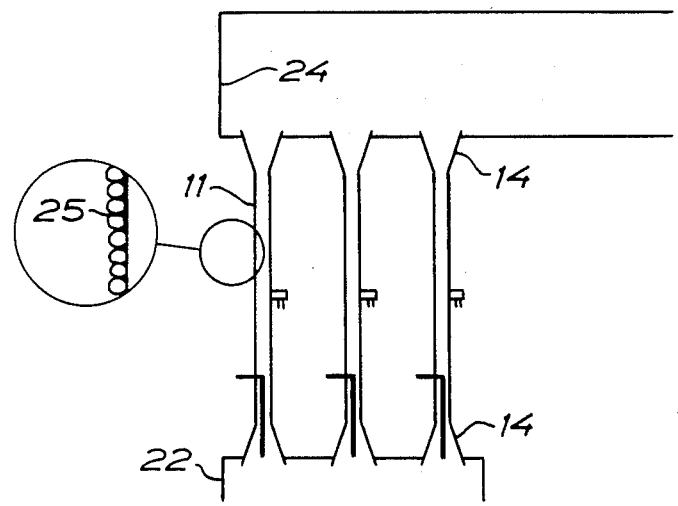
Figure 7:
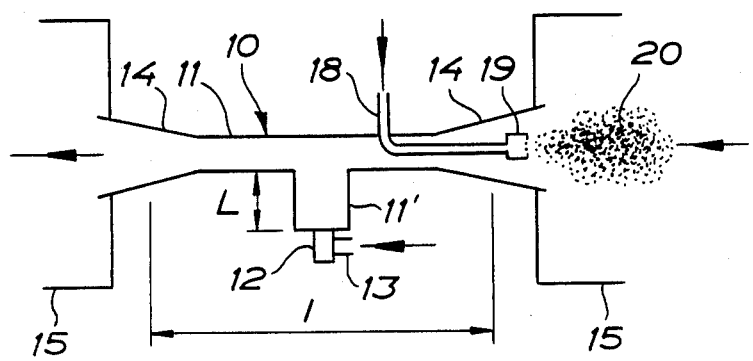
Figure 8:
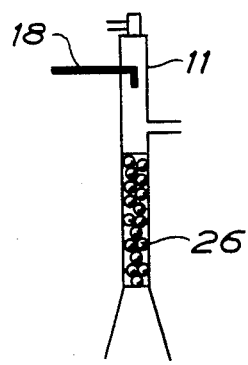

In order to illustrate the invention embodiments thereof will be described below, reference being made to the accompanying drawings in which FIG. 1 is a diagrammatic longitudinal sectional view of one embodiment of an apparatus for working the method of the invention including a three quarter wave sound generator, FIG. 2 is a view similar to FIG. 1 of a modification of the apparatus shown therein, FIG. 3 is a fragmentary vertical sectional view of a boiler including a set of apparatus of the embodiment shown in FIG. 2, FIG. 4 is a diagrammatic longitudinal sectional view of a second embodiment of the apparatus of the invention including a half wave sound generator, FIG. 5 is a view similar to FIG. 4 of a modification of the apparatus shown therein, FIG. 6 is a view similar to FIG. 3 including a set of apparatus as shown in FIG. 4, FIG. 7 is a view similar to FIG. 4 of a second modification of the apparatus shown therein, and FIG. 8 is a view similar to FIG. 1 of a third embodiment of the invention.

Referring to FIG. 1 a low frequency sound generator 10 is shown therein which can be of the positive feedback type described in US Pat. No. 4,359,962 of Nov. 23, 1982. However, any other infrasound generator can be used for the purpose of the invention.

The maximum frequency of the sound should be 150 Hz. Preferably, the frequency is 40 Hz or lower. However, in most cases 20 Hz or lower (infrasound) is optimal.

The sound generator 10 comprises a tubular resonator 11 closed at one end and open at the other end, the acoustic length of which, designated 1, is three quarter of the wave length of the sound emitted. The diameter of the resonator should be substantially less than said wave length. A feeder or drive unit 12, herein termed exigator for the puprpose of this specification, is mounted at the closed end of the resonator and is connected to a supply conduit 13 for driving gas (air) supplied to and passing through the resonator under the control of the exigator as described in the US patent specification referred to above. At the open end the resonator is flared to form a diffusor 14 which connects to a space 15 forming a substantial enlargement in relation to the interior of the resonator. An inlet 16 to the space 15 is located opposite to the opening of the diffuser. An outlet 17 is provided in the resonance tube located in the resonator substantially in a region where the sound pressure of the standing wave in the resonator has a node, i.e. one third of the length of the resonator from the exigator.

A conduit 18 extends radially into the resonator at a position between the ends thereof and then extends axially through the resonator towards the opening of the diffuser 14 to terminate close to the opening of the diffuser where the particle velocity of the standing wave of the sound has an antinode. The terminating end of the conduit is provided with a nozzle 19.

The apparatus described is well suited for spray drying liquids, e.g. in the manufacture of instant products such as dry milk and instant coffee, and in connection with the supply of slurries of chemicals, e.g. a slurry of $Ca(OH)_2$ and/or $CaCO_3$ and water, for removal of $SO_2$ or $SO_3$ from flue gases by applying the method of the invention.

In the method of the invention gas such as hot air or hot flue gas is supplied to the space 15 through the inlet 16 and is passed to the outlet 17 through the resonator 11. The liquid to be processed in the case of the manufacture of an instant product or the slurry in the case of processing flue gas, is supplied to the nozzle 19 through the conduit 18 to be atomized and to enter the space 15 as a mist indicated at 20 which meets the gas entering through the inlet 16.

By the heat supplied by the hot air or the hot flue gas the liquid phase of the atomized liquid or slurry in the mist will be evaporated when contacting the air or gas. Under the influence of the high turbulence in the gas caused by the low frequency sound generated by the low frequency sound generator 10, an intimate mixture of the air and liquid or the flue gas and the slurry, respectively, will be obtained intensifying the evaporation of the liquid or the liquid phase in the space 15 and particularly in the resonator tube 11. Thus, the air or gas including the evaporated liquid, with solid particles emanating from the liquid or slurry supplied entrained therein, will pass through the resonator tube and will be discharged therefrom through the outlet 17.

It is not necessary that the nozzle 19 is located in the diffuser. It can as well be located in the space 15 or in the inlet 16 but notwithstanding the location thereof it should preferably be directed to supply the liquid or slurry in counterflow relation to the air or gas supplied through the inlet 16.

A further increase in efficiency may in some cases be achieved by extending the length of the resonator 11 to five or seven quarters of the wave length of the sound. In principle any odd number of quarters of the wave length can be used.

In the embodiment of FIG. 2 the resonator 11 forms an enlargement 21 at the outlet 17. In order to allow a large flow through the outlet as may be necessary in the practical application of the invention, it may be necessary to construct the outlet with a large diameter causing disturbance of the operation of the sound generator. In order to minimize such disturbance the enlargement is provided allowing the diameter of the outlet to be increased without adversely affecting the operation of the sound generator.

The embodiment of FIG. 2 is particularly well suited for the supply of pulverulent or gaseous fluids into the flue gas of boilers in regions where the temperature is high. e.g. in order to reduce the content of $SO_2$ and $SO_3$ in flue gas it is common practice to add $Ca(OH)_2$ and/or $CaCO_3$ to the flue gas. The reaction between these compounds and $SO_2$ and $SO_3$ present in the flue gas is effected optimally at a temperatuare in the range of 1000 C.

However, the compounds cannot simply be injected into a gas flow having a temperature in the said range due to the practical difficulties in obtaining a thorough mixture of the additives and the gas considering the high viscosity of the flue gas at high temperatures. In case of fluidized bed combustion the additives are supplied to the fluidized bed but in other cases the additives usually are supplied as a water slurry in a region where the flue gas temperatuare in the range of 200 C. At that temperature the reaction is slow and requires large equipment.

In order to reduce the content of NO and $NO_2$ in flue gas amonia is used as an additive. The reaction involved is at optimum at a temperature in the range of 1000 C. and for the reasons mentioned above the additive cannot be injected in the flue gas at this high temperature. Therefore, the reaction is carried out at a lower temperature, e.g. around 350 C., in the presence of a cathalyst usually comprising vanadium-pentoxide $V_2O_5$. This cathalyst is expensive and must be replaced from time to time, which makes the process expensive.

The inventors have found that in the upper portion of conventional utility boilers which are most common the temperature of the flue gas is about 1000 C. and therefore this region would be well suited for effecting both reactions mentioned above if it was possible to inject the additives in the flue gas. This can successfully be done by using the method and apparatus of the invention.

Referring to FIG. 3 the upper part of a utility boiler having a combustionchamber 22, is provided at the top thereof where the said region of 1000 C. is located with a number of sound generators of the embodiment shown in FIG. 2. The diffuser 14 of each generator is conencted to the top wall of the boiler and communicates with the combustion chamber 22 thereof which thus forms space 15 shown i FIG. 2. In order to pass the flue gas into the sound generators a wall 23 separates the combustion chamber 22 of the boiler from a convection area 24 thereof, otherwise communicating directly with the combustion chamber 22 in the absence of the wall 23. The outlet 17 of each sound generator is connected to the convection area 24. The additive, e.g. $CaCO_3$ in powder-form and $NH_3$ in gas form is supplied through the conduit 18 of each sound generator to be dispersed in the flue gas by means of the nozzles 19. Under the influence of the low frequency sound the additives are thoroughly mixed with the flue gas in the resonator 11.

Preferably an even number of sound generators should be provided allowing pairs of sound generators to operate in counter-phase, which reduces the resulting noise. In order to positively control the phasing of the sound generators in this arrangement, each pair of sound generators preferably should be spaced at a distance from each other which is shorter than the distance to adjacent sound generators.

The sound generator 10 shown in FIG. 4 is of the half wave length type wherein the acoustic length 1 is half the wave length of the sound generated by the sound generator. The tubular resonator 11 in this case is open at both ends and the exigator 12 is located intermediate the ends at the longitudinal center of the resonator. The diffuser 14 at one end of the resonator is connected to a space 15 and the conduit 18 is extended into said diffuser for the supply of a fluid through the associated nozzle 19. Also at the other end a diffuser 14' is arranged which is connected to a space 15'. Thus, gas entering the space 15 is allowed to pass through the resonator from one end to the other so as to be discharged into the space 15'.

In the embodiment shown in FIG. 4 the sound pressure of the standing wave in the resonator has a node in each end region of the resonator. Additives are supplied to the gas passing through the resonator in the manner previously described.

When this generator is used in connection with a utility boiler the diffuser 14 is conencted to the combustion chamber 22 of the boiler as shown in FIG 6 and the diffuser 14' is connected to the convention area 24. The function of the embodiment shown in FIG. 6 is the same as that described with reference to FIG. 3.

In principle the resonator tube of the embodiment shown in FIG. 4 can have a length which is a multiple of half the wave length with an exigator provided at one or more of the antinodes of the standing sound wave, i.e. where the sound pressure is at maximum. In the case of several exigators, the exigators provided being operated synchronously.

In the embodiment shown in FIG. 4 the driving gas supplied to the sound generator will cause a temperature fall of the flue gas passing through the resonator tube. This can be avoided in the case of using an exigator comprising two compartments, as shown in FIG. 5, to which reference now is made.

In this type of exigator, as is also described in above mentioned U.S. Pat. No. 4,359,962, the driving as is fed into one of the compartments through conduit 13 and sucked from the other through conduit 13', i.e. the driving gas does not cool the flue gas.

One problem with the arrangement as shown in FIG. 6 is that the length of the resonator tubes could substantially increase the total height of the boiler. In the case of a temperature of the flue gas of 1000 C., one half of the wave length of the sound is equal to about 17 meters at 20 Hz.

By the arrangement shown in FIG. 7, to which reference now is made, tubes 11 and 11' together form a half wave resonator. It is possible to get a standing wave in a sound generator of this type if the cross sectional area of the tube 11' is about duoble the cross sectional area of the tube 11, $1 = \lambda/2 - 2L$, where $\lambda$ is the wavelength of the sound. This shows that the length between the ends of the resonator could be shortened by this arrangement.

The turbulence caused by the low frequency sound will only occur in the end regions of the half wave resonator. In the middle of the standing wave, the sound particle velocity has its minimum, i.e. the sound does not generate turbulence in this section.

By the arrangement shown in FIG. 7, almost no turbulence is achieved in the part 11' but there is a rather high level of turbulence in all parts of tube 11.

Another advantage of this arrangement is that the exigator 12 is placed at a point where the gas temperature is lower compared to the arrangement shown in FIG. 4.

This method of shortening the resonator tube could also be applied to the arrangement shown in FIG. 1 and FIG. 2.

It would be necessary in most cases to provide the resonator 11 at the outside thereof with tubes 25 for circulating a coolant so as to keep the temperture of the resonator wall at an acceptable temperature, as shown in FIG. 6. The same arrangement could of course be adhered to in case of the embodiment shown in FIG. 3.

The nozzle 19 can be replaced by the arrangement shown in FIG. 8 in cases where a liquid is supplied to a gas to be evaporated or to react with said gas or a substance contained therein. A body 26 of filler material allowing gas to pass through said body, is supported in the resonator 11 below the opening of the conduit 18. Thus, the gas when passing through the filler body will be brought into contact with the liquid supplied to the body from the conduit 18. The contact between the liquid and the gas will be intensified under the influence of the low frequency sound.

We claim:

1. Method for increasing the turbulence in a gas exposed to low frequency sound produced by a sound generator including a tubular resonator having an open end, characterized in that the sound generator is operated at one of the resonance frequencies of the resonator, having a maximum frequency of 150 Hz, and that said gas is flown into the tubular resonator through the open end thereof and is discharged from the resonator substantially in a region where the sound pressure of the standing wave in the resonator has a node, after having passed through a substantial length of the resonator.

2. Method as claimed in claim 1, characterized in that a second fluid comprising a powder, liquid or gas or a mixture thereof, is supplied to said gas to be mixed therewith under the influence of the increased turbulence.

3. Method as claimed in claim 2, characterized in that said second fluid is supplied in counterflow relation to said gas.

4. Method as claimed in claim 1, characterized in that said gas is flown into the tubular resonator from a space communicating with the resonator at the open end thereof and forming a substantial enlargement in relation to the interior of the resonator.

5. Method as claimed in claim 1, characterized in that said second fluid is supplied close to the opening of the tubular resonator.

6. Method as claimed in claim 1, characterized in that said gas is passed through the tubular resonator from said one open end thereof to another open end thereof.

7. Apparatus for increasing the turbulence in a gas by the method as claimed in claim 1, comprising a sound generator including a tubular resonator having an open end, said resonator having a diameter which is substantially less than the wave length of the sound emitted, and means for supplying said gas to the resonator at the open end thereof, characterized by an outlet on the tubular resonator for discharging the gas from the tubular resonator in a node region of the sound pressure at a substantial distance from the open end of the tubular resonator.

8. Apparatus as claimed in claim 7, characterized by means defining a space which forms a substantial enlargement in relation to the interior of the tubular resonator.

9. Apparatus as claimed in claim 7, characterized in that the tubular resonator is a three quarter wave resonator open at one end and closed at the other end.

10. Apparatus as claimed in claim 9, characterized in that the outlet is located at a distance from the open end of the resonator which is substantially equal to one half of the wave length.

11. Apparatus as claimed in claim 10, characterized in that the tubular resonator forms an enlargement at the outlet.

12. Apparatus as claimed in claim 7, characterized in that the tubular resonator is a half wave resonator open at both ends thereof for passing said gas through the resonator form one end thereof to the other.

13. Apparatus as claimed in claim 12, characterized in that the tubular resonator forms a diffusor at each open end thereof.

14. Apparatus as claimed in claim 12, characterized in that the sound generator is of the pneumatic type operated by alternatingly supplying and exhausting air to and from, respectively, the drive unit thereof.

15. Apparatus as claimed in claim 12, characterized in that the resonator is a T-shaped resonator the cross bar portion of which forms a through passage for said gas and the stem portion of which has a cross sectional area which is substantially twice the cross sectional area of the cross bar portion, the drive unit of the sound generator being connected to the closed end of said stem portion.

* * * * *

UNITED STATES PATENT AND TRADEMARK OFFICE
CERTIFICATE OF CORRECTION

PATENT NO. : 4,721,395

DATED : 26 January 1988

INVENTOR(S) : Mats A. Olsson and Hans-Bertil Hakansson

It is certified that error appears in the above-identified patent and that said Letters Patent is hereby corrected as shown below:

Column 6, line 52, "form" should be --from--

Signed and Sealed this

Nineteenth Day of July, 1988

*Attest:*

DONALD J. QUIGG

*Attesting Officer*  Commissioner of Patents and Trademarks